C. H. MOORE.
CULTIVATOR.
APPLICATION FILED APR. 15, 1914.
1,128,486.
Patented Feb. 16, 1915.
2 SHEETS—SHEET 2.
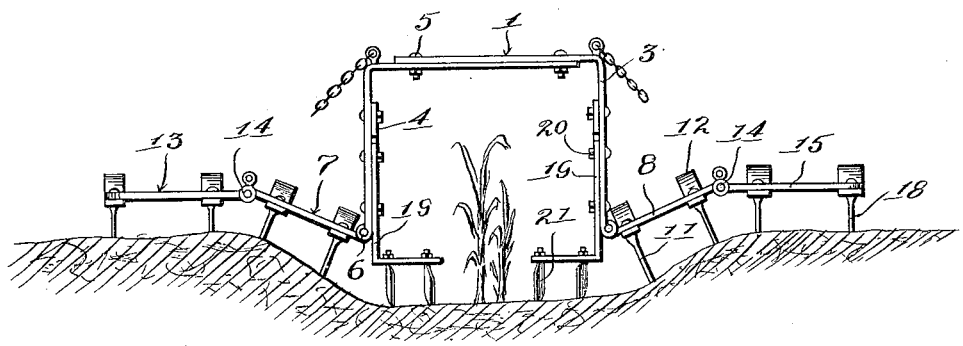
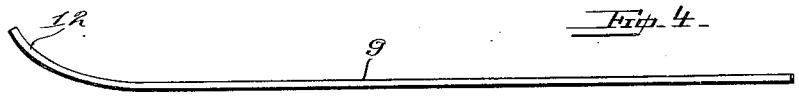
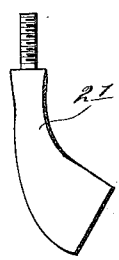
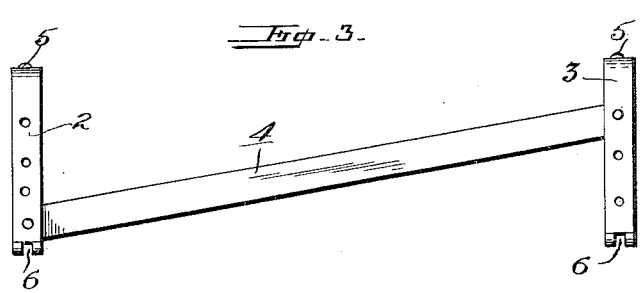
Witnesses
Edw. S. Hall.
W. E. Valk Jr.
Inventor
Chauncey H. Moore.
By Richard Bowen,
his Attorney

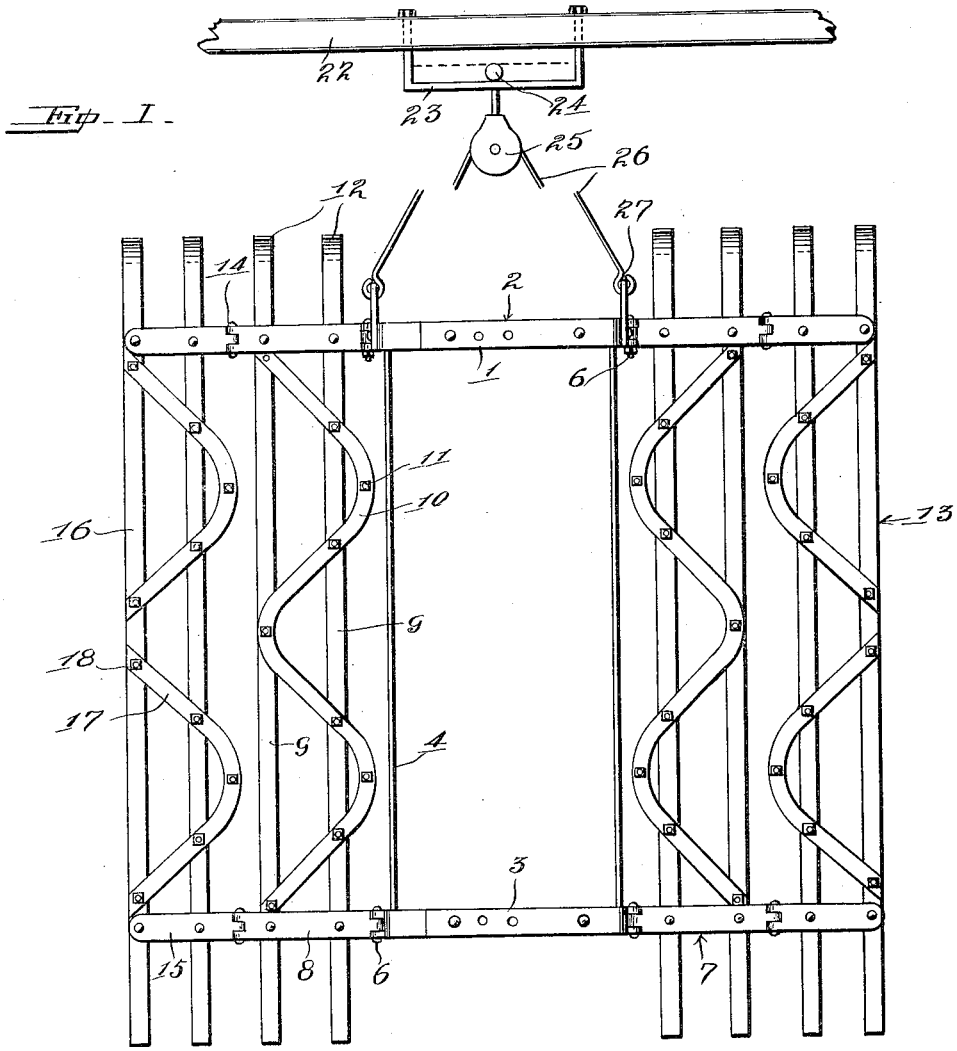

UNITED STATES PATENT OFFICE.

CHAUNCEY HOWARD MOORE, OF BLOOMFIELD, NEBRASKA.

CULTIVATOR.

1,128,486.   Specification of Letters Patent.   Patented Feb. 16, 1915.

Application filed April 15, 1914. Serial No. 832,069.

*To all whom it may concern:*

Be it known that I, CHAUNCEY HOWARD MOORE, citizen of the United States, residing at Bloomfield, in the county of Knox and State of Nebraska, have invented certain new and useful Improvements in Cultivators, of which the following is a specification.

My invention relates to improvements in combined harrows and cultivators, the objects in view being to provide a harrow and cultivator combined and adapted to operate upon listed corn; to provide means for adjusting certain of the cultivator teeth so as to penetrate deep or shallow; to provide for the protection of the young corn from the dirt thrown by the shovels or teeth of the cultivator; and to provide for uniform cultivation of the soil when operating within deep or shallow furrows.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a top plan view, partly broken away, of a cultivator constructed in accordance with the present invention; Fig. 2 is a rear end view; Fig. 3 is a side elevation illustrating the arrangement of one of the protector strips; Fig. 4 is an edge view of one of the wing strips; and Fig. 5 is a detail elevation of one of the harrow teeth.

Referring now to the drawings by numerals, 1 designates the arched portion of the cultivator, the said arched portion comprising a forward section 2, and a rear section 3, the said two sections being connected by strips 4 disposed at an angle, one upon each side of the arch, said strips providing for the protection of the young corn from the dirt thrown and disrupted by the teeth of the device. Each arched section is so constructed as to permit lateral adjustment of the cultivator, such adjustment being made possible by dividing each section as indicated in Fig. 2 of the drawings. The divided portions of the said sections are detachably and adjustably connected as indicated at 5.

Hingedly connected, as at 6 to each section of the arch, and at the base thereof, is a lateral wing 7. The wings upon each side of the arch being the same, the detail construction of but one of the wings will be herein set forth. Said wing in its preferred embodiment includes end plates or strips 8, said strips being arranged in parallel relation and in line with the arch sections 2 and 3. Longitudinal strips 9, extending parallel with the protector strips 4, connect the said strips 8, said longitudinal strips serving as a brace and support for a tortuous strip 10 extending longitudinally of the wing. Teeth 11, independently adjustable, are carried by the said tortuous strip 10, the teeth being positioned in staggered relation in the manner illustrated to advantage in Fig. 1. Said longitudinal strips 9 are of a length sufficient to extend forwardly of the forward strip 8, said strips 9 being curved upwardly at their forward end as indicated at 12 for the obvious purpose of causing the cultivator to ride bodily over any rise or obstruction of the ground acted upon.

An auxiliary lateral wing designated as an entirety by the numeral 13 is hingedly connected as at 14 to the free terminals of the respective strips 8 aforesaid, the said auxiliary wing comprising lateral strips 15 and longitudinal strips 16, the same being arranged in much the same manner as the strips 9 and 8 above noted. Said lateral wing 13 carries a tortuous strip or strips 17 for the purpose of arranging the teeth 18 in staggered relation and suitably spaced apart.

Substantially L-shaped brackets 19 are adjustably connected as at 20, one to each side of the rear section 3 of the arch, the lateral extensions of each bracket in turn supporting vertically adjustable teeth or shovels 21, so positioned relatively to the corn acted upon as to disrupt the soil adjacent thereto and force the same toward and upon the young corn.

As a means whereby the cultivator may be moved laterally independent of the draft applied thereto, I provide a suitable tongue 22, to which is connected a clevis 23. A suitable roller 24 operates over the clevis 23, the roller being connected to a pulley 25 over which operates a flexible element 26 the ends of which are connected as at 27 to the vertical portions of the forward arch section 2. By the above arrangement, and by providing for vertical adjustment of the connecting point 27, it is apparent that the cultivator will follow the furrow within which the corn is planted irrespective of the movement of the propelling force.

From the foregoing, taken in connection with the accompanying drawings it is apparent that the wings 7 and 13 will automatically adjust themselves to act evenly upon the soil and cultivate the same at a uniform depth; that the strips 4 will prevent the disrupted soil from being thrown inwardly and against the young or sprouting corn; and that the size of the arch may be varied through manipulation of the fastening means indicated at 5 to position the wings 7 and 13 as desired relatively to the size of the furrow.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a cultivator, an arched portion, lateral wings affixed to the arch, brackets secured to the arched portion, the brackets being adjustable relatively thereto, and teeth mounted on the brackets, the said teeth being adjustable relatively thereto, as and for the purpose set forth.

2. In a cultivator, an arched portion, wings hingedly connected to the arched portion, teeth carried by the respective wings, brackets carried by and adjustable relatively to the arched portion, and teeth carried by and adjustable relatively to the brackets.

3. In a cultivator, a central arched portion, said arch portion comprising a pair of arch sections, said sections being divided, the divisions being laterally adjustable to vary the size of the arch, a lateral wing hingedly connected to the said arch at each side thereof, an auxiliary wing hingedly connected to each lateral wing, teeth carried by said wings, brackets carried by one of said arch sections, teeth carried by said brackets, and means adjustably fastening said bracket to said arch section, as and for the purpose set forth.

In testimony whereof I affix my signature in presence of two witnesses.

CHAUNCEY HOWARD MOORE.

Witnesses:
CORNELIUS J. HECHT,
PAUL H. TULLEYS.